Aug. 30, 1932.  N. CLARK  1,874,447
CAR COUPLER
Filed Aug. 16, 1929
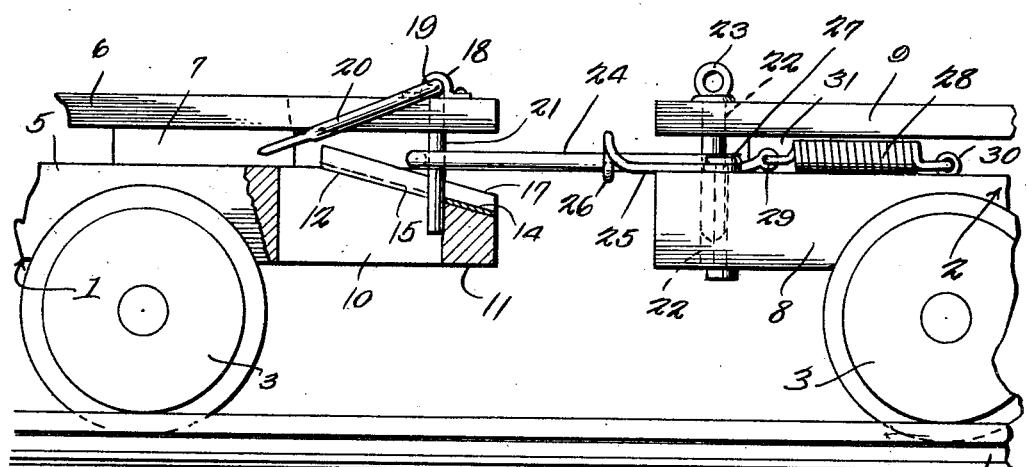
Nathaniel Clark
Inventor Patented Aug. 30, 1932

1,874,447

UNITED STATES PATENT OFFICE

NATHANIEL CLARK, OF CLOTHIER, WEST VIRGINIA

CAR COUPLER

Application filed August 16, 1929. Serial No. 386,302.

This invention aims to provide a simple means whereby mine cars, or other vehicles, may be coupled together, without rendering it necessary for the brakeman or attendant to walk between the cars to effect a coupling, it being a matter of common knowledge that mashed arms, and other serious injuries, have resulted when car coupling must be brought about by the link and pin method.

It is within the province of the disclosure to improve generally and to enhance the utility of devices of that sort to which the present invention appertains.

With the above and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawing:

Figure 1 shows in side elevation, portions of a pair of cars, coupled together by the mechanism forming the subject matter of this application, parts being in section;

Figure 2 is a top plan, wherein parts are broken away;

Figure 3 is a perspective view showing the wear plate.

In Figures 1 and 2, portions of a pair of cars 1 and 2 are shown, the cars being carried by wheels 3 adapted to traverse a track 4. The cars 1 and 2 may be mine cars, or cars of any other desired sort, but since the present invention relates to car couplers, and not to cars themselves, the simplest sort of car has been shown in the drawings, it being understood that the coupler hereinafter described and claimed, may be attached to any car for which it is adapted.

The car 1 comprises a base 5 and a platform 6, forming the body of the car, any desired number of spacers 7 being interposed between the base and the platform. The body of the car 2 comprises a base 8 and a platform 9, with spacers 31 therebetween.

In the base 5 of the car 1, there is a longitudinal slot 10, the forward end of the slot 10 defining a shoulder 11. The upper surface of the base 5 is downwardly and longitudinally inclined, as shown at 12, above a portion of the slot 10. On the inclined surface 12 of the base 5 is secured a metal wear plate 14 having a slot 15 which registers with the slot 10 in the base 5. In the platform 6 there is a longitudinal opening 16 which coincides with the slot 15 of the wear plate 14. The wear plate 14 has upstanding flanges 17 which converge as they extend rearwardly, an observation which will be understood readily when Figures 3 and 2 are compared.

Bearings 18 are mounted on the platform 6 of the car 1, and in the aforesaid bearings a shaft 19 is mounted for rocking movement. The shaft 19 extends transversely of the car 1, and is provided at its outer end with an operating member 20, preferably a handle, which swings clear of the edge of the platform 6, as Figure 2 will show. On the inner end of the shaft 19 there is an arm 21, forming a coupling pin. The arm 21 is adapted to swing downwardly through the aligned holes 16, 15, and 10, the arm coming to rest against the shoulder 11, as disclosed in dotted line in Figure 1 of the drawings.

In the platform 9 and in the base 8 of the car 2 there are vertically aligned holes 22 in which a coupling pin 23 is removably mounted. The coupling pin 23 is inserted through a link 24, one end of which extends between the base 8 and the platform 9 of the car 2. The coupling pin or arm 21 on the car 1 extends through the opposite end of the link 24, and the last-specified end of the link is located between the platform 6 and the base 5 of the car 1.

The numeral 25 designates a link carrier, in the form of a lever, provided at its outer end with a link support, such as a transverse hook 26, which engages beneath one side portion of the link 24. The link carrier or lever 25 is fulcrumed intermediate its ends, as at 27, on the base 9 of the car 2 for horizontal swinging movement. The numeral 28 marks a retractile spring, one end of which is connected at 29 to the inner end of the lever or link carrier 25, the opposite end of the spring 28 being anchored at 30 to the base 8 of the car 2.

The spring 28 cooperates with the lever 25 to hold the lever in such position that it will keep the link 24 parallel to the car 2. A hook 26 on the lever 25 supports the link 24 in such a position that when the cars 1 and 2 are moved toward each other, the outer end of the link 24 will ride up on the inclined wear plate 14 of the car 1, between the converging guiding flanges 17. The link 24 engages the arm 21 and rocks the shaft 19, the arm 21 swinging clockwise in Figure 1. Ultimately, the link 24 is advanced far enough on the inclined wear plate 14 so that the arm 21 can drop back through the link 24, against the shoulder 11, under the weight of the operating member or handle 20, and when either the car 1 or the car 2 is subjected to a pull, the parts will appear as shown in Figure 1 of the drawing. It will be obvious that the operation last-above described takes place without making it necessary for an operator to get between the cars, to his obvious peril.

When it is desired to uncouple the cars, the cars are simply shoved toward each other a little way, and the arm 21 is swung clear of the link 24, by means of the handle 20, the shaft 19 rocking in the bearings 18.

It will be understood, without specific delineation, that the left-hand end of the car 1 carries a coupling mechanism like the one shown at the left-hand end of the car 2, and that the right-hand end of the car 2 is provided with a coupling mechanism like the one shown at the right-hand end of the car 1.

I claim:—

A mine car embodying a platform whereon the load of the car is carried, and a base underneath the platform and spaced therefrom, the base having a downwardly sloping upper surface at its outer end, a renewable wear plate on the sloping surface of the base, the platform overhanging and protecting the wear plate, the wear plate, the platform and the base terminating at their outer end in approximately the same vertical plane, the platform and the base having vertically aligned slots of the same size and shape extended entirely therethrough and spaced inwardly from the outer end of the platform and the base, bearings on the upper surface of the platform, all of the bearings being located on one side of the slot, a transverse shaft journaled in the bearings, the shaft extending inwardly from one edge of the platform to the slot, the platform being open to receive part of the load, from the opposite edge of the platform to the slot, the shaft being provided at one end with an operating handle disposed at the first-specified edge of the platform, the shaft being provided at its opposite end with a swing pin received in the slot, the wear plate being provided with a notch that opens through the inner end of the wear plate, the notch registering with the slot, the swing pin abutting against the wear plate at the outer end of the notch in the wear plate and abutting against the base at the outer end of the notch, and means for securing the wear plate renewably and detachably to the sloping surface of the base.

In testimony that I claim the foregoing as my own, I have hereto affixed my signature.

NATHANIEL CLARK.